United States Patent
Merlinge et al.

(10) Patent No.: US 12,511,583 B2
(45) Date of Patent: Dec. 30, 2025

(54) PARTICLE FILTERING AND NAVIGATION SYSTEM USING MEASUREMENT CORRELATION

(71) Applicant: OFFICE NATIONAL D'ETUDES ET DE RECHERCHES AÉROSPATIALES, Palaiseau (FR)

(72) Inventors: Nicolas Merlinge, Palaiseau (FR); Clément Audebert, Asnieres (FR); Karim Dahia, Palaiseau (FR); Bruno Herisse, Palaiseau (FR); Jean-Michel Allard, Palaiseau (FR)

(73) Assignee: OFFICE NATIONAL D'ETUDES ET DE RECHERCHES AÉROSPATIALES, Palaiseau (FR)

( * ) Notice: Subject to any disclaimer, the term of this patent is extended or adjusted under 35 U.S.C. 154(b) by 876 days.

(21) Appl. No.: 17/783,363

(22) PCT Filed: Dec. 7, 2020

(86) PCT No.: PCT/EP2020/084829
§ 371 (c)(1),
(2) Date: Jun. 8, 2022

(87) PCT Pub. No.: WO2021/115998
PCT Pub. Date: Jun. 17, 2021

(65) Prior Publication Data
US 2023/0011501 A1 Jan. 12, 2023

(30) Foreign Application Priority Data
Dec. 13, 2019 (FR) ........................... 1914349

(51) Int. Cl.
*G06N 20/10* (2019.01)
*G06F 7/58* (2006.01)
(Continued)

(52) U.S. Cl.
CPC ............ *G06N 20/10* (2019.01); *G06F 7/584* (2013.01); *G06F 17/18* (2013.01); *G06F 18/2415* (2023.01)

(58) Field of Classification Search
CPC ... G01C 21/165; G06F 17/18; G06F 18/2415; G06F 7/584; G06N 20/10
See application file for complete search history.

(56) References Cited

U.S. PATENT DOCUMENTS

| | | | |
|---|---|---|---|
| 6,408,245 B1 * | 6/2002 | An ........................ | G01S 19/47 701/472 |
| 2005/0251328 A1 * | 11/2005 | Merwe .................. | G01S 19/49 701/472 |

(Continued)

OTHER PUBLICATIONS

International Search Report and Written Opinion for PCT/EP2020/084829, mailed Mar. 10, 2021, 10 pages.
(Continued)

*Primary Examiner* — Yoshihisa Ishizuka
(74) *Attorney, Agent, or Firm* — NIXON & VANDERHYE

(57) ABSTRACT

Disclosed is a box-regularized particle filtering process which includes an Epanechnikov kernel smoothing step. For this purpose, the process uses a special method for generating random numbers that follow an Epanechnikov probability density function. The process can be performed autonomously in a navigation system using correlation measurement, in particular on board an aircraft such as an aircraft, a flying drone or any self-propelled aerial carrier.

20 Claims, 4 Drawing Sheets

(51) Int. Cl.
*G06F 17/18* (2006.01)
*G06F 18/2415* (2023.01)

(56) References Cited

U.S. PATENT DOCUMENTS

2006/0074558 A1* 4/2006 Williamson ............ G01S 19/15
342/357.56
2009/0182493 A1* 7/2009 McDonald .............. G01S 19/20
342/357.53

OTHER PUBLICATIONS

Merlinge et al., A Box Regularized Particle Filter for state estimation with severely ambiguous and non-linear measurements, Automatica, vol. 104, Mar. 12, 2019, 20, pp. 102-110, XP055664432.
Musso et al., "Improving Regularized Particle Filters," Sequential Monte Carlo Methods in Practice, 2001, vol. 12, pp. 247-271.
Merlinge et al., "A Box Regularized Particle Filter for terrain navigation with highly non-linear measurements," IFAC-PapersOnLine, 2016, vol. 49, No. 17, pp. 361-366.

* cited by examiner

PARTICLE FILTERING AND NAVIGATION SYSTEM USING MEASUREMENT CORRELATION

CROSS-REFERENCE RELATED TO PRIORITY APPLICATIONS

This application is the U.S. national phase of International Application No. PCT/EP2020/084829 filed Dec. 7, 2020, which designated the U.S. and claims priority to FR Patent Application No. 191439 filed Dec. 13, 2019, the entire contents of each of which are hereby incorporated by reference.

BACKGROUND OF THE INVENTION

Field of the Invention

The present invention relates to a particle filtering method, as well as a computing unit and a navigation system using measurement correlation that implement such a method. More particularly, the particle filtering method is of the box regularized type.

Description of the Related Art

The navigation function of an aircraft includes estimation of its instant position, its instant speed and its instant orientation, referred to as attitude, in the navigation reference frame, also referred to as the local geographical trihedron. All the instant values of the position coordinates, i.e. the latitude, the longitude and the attitude of the aircraft, of speed, comprising a speed coordinate in the direction of North, a speed coordinate in the direction of East and a downward speed coordinate, and of attitude angles of the aircraft, comprising a roll angle, a pitch angle and a yaw angle, constitute the instant state of the system formed by the aircraft. The aircraft may be an airplane, a drone or any self-propelled aerial carrier, without limitation.

The acceleration and the angular speed of the aircraft are measured repetitively and at high rate, each along three axes, for example at a repetition frequency of approximately 1000 Hz (hertz), by means of accelerometers and gyrometers of an inertial unit that is on board the aircraft. The navigation system then delivers estimates of position and speed coordinates, and attitude angles of the aircraft, by integrating the results of the accelerometric and gyrometric measurements over time. However, each measurement of acceleration and angular velocity is affected by an error, which is mainly composed of a bias, a scale factor and a random process, and the accumulation of the measurement errors results in an error that affects the estimation of the instant state of the aircraft. This error on the instant state that is estimated increases as a function of time, and is commonly referred to as inertial drift. It is then necessary to associate the inertial unit with at least one additional sensor, in order to correct or reduce the inertial drift.

Usual methods for correcting or reducing inertial drift consist in using geolocation signals, such as satellite navigation signals, for example of the GNSS type, standing for "global navigation satellite system", or using signals that are produced by beacons located on the ground, for example radionavigation signals or signals of the GBAS type, standing for "ground-based augmentation system", or receiving by radio a location of the aircraft produced by means of radar. However, such methods are sensitive to interference or to decoys, to the availability of coverage of the area where the aircraft is located in positioning or communication signals, etc. It is then desirable in some circumstances to have on board the aircraft a method that is autonomous for correcting and/or reducing inertial drift. For this purpose, it is usual to associate with the inertial unit a telemetry sensor that measures a distance between the aircraft and the ground. This telemetry sensor may be a radio-altimeter, a laser telemeter, etc., without limitation. It measures the distance between the aircraft and the ground along a direction that may be fixed or not with respect to the aircraft. When this distance measurement direction may be variable, its orientation with respect to the aircraft is known. The inertial unit is then also associated with a computing unit that correlates results of successive measurements that are made by the telemetry sensor with the instant state of the aircraft as estimated by the inertial unit. More precisely, a characterization of the zone over which the aircraft is flying is stored on board the aircraft, for example in the form of a relief map that associates a relief height value with each pair of latitude and longitude values. Such a relief map record may be in the form of a table, with the latitude and longitude constituting the inputs of the table, and the relief height values constituting the reading responses in the table. Alternatively, the characterization of the zone being flown over may be stored in the form of an analytical function that makes it possible to compute the relief height values as a function of the latitude or longitude values, or in any other suitable form. Then, at each new estimation of the instant position of the aircraft that is produced by the navigation system, a value of the distance that should exist between the aircraft and the ground is obtained by interrogating the characterization of the zone being flown over as stored on board the aircraft, in accordance with the estimated position of the aircraft. Optionally, the aircraft-ground distance value may result from a computation that combines the estimated position of the aircraft with the result or results of one or more interrogations of the characterization of the zone being flown over that is stored on board the aircraft, in particular when the measurement direction of the telemetry sensor is oblique with respect to the altitude axis. Such a computation is known to persons skilled in the art, so that it is not necessary to repeat it here. The aircraft-ground distance value that is thus estimated is next compared with the measurement result that is delivered by the telemetry sensor. Such navigation method with measurement correlation is commonly referred to as navigation with terrain correlation. Several variants of it have been proposed, but some of them have great sensitivity to the existence of non-linearities of the terrain profiles. In other words, they have the drawback of lack of robustness in their efficiency of convergence towards the true state of the aircraft, according to the possible terrain profiles.

The navigation methods using terrain correlation that are based on a box-regularized particle filter, or BRPF, make it possible to correct the inertial drift with greater robustness, compatible with the existence of non-linearities and terrain ambiguities. The article by Merlinge, N., Dahia, K., Piet-Lahanier, H., Brusey, J., & Horri, N., which is entitled "A Box Regularized Particle Filter for state estimation with severely ambiguous and non-linear measurements", Automatica (2019), Vol. 104, pp. 102-110, describes such method. Each of these methods then consists in iteratively computing an instant state of the aircraft from a last state determined previously, and correlating the distance measurement result that is obtained by the telemetry sensor with a distance value that is moreover reconstituted from the characterization of the terrestrial relief loaded on board the aircraft and position and attitude values. However, a box-regularized particle filter proceeds by manipulating state intervals, of nine-dimension when each state of the aircraft is formed by three position coordinates, three speed coordinates and three attitude angles as described above. In addition, a weight value with probabilistic signification is associated with each state interval: the weight of each state interval corresponds to the probability of the true state of the aircraft being located in this state interval. However, these navigation methods with terrain correlation that are based on particle filters have not yet been implemented for real aircraft, because of the very great computing resources that are necessary. This is why it is required, for numerous aeronautical applications, for the navigation method using terrain correlation that is used to be able to be implemented by a computing unit of the field-programable gate array type, or FPGA. However, the circuits of this type have capacities that are still too limited.

However, it is known that such a box-regularized particle filtering method provides better statistical characterization of the true state of the aircraft if random jamming of the state intervals is added, to reduce correlations that exist between at least some of the state intervals as these state intervals result directly from the particle filtering. This random jamming consists in modifications of the bounds that determine each state interval, or in an equivalent manner modifications that are applied to the center values and lengths of intervals that determine each state interval on all the state coordinates. It is also known that the random jamming that is thus added is best adapted to such particle filtering method when it corresponds to a probability density function of the type $f(x)=3\cdot(1-x^2)/4$, referred to as Epanechnikov kernel, where x is a random variable comprised between −1 and 1, the values −1 and 1 being permitted. However, generating random variables according to such Epanechnikov kernel by limiting the computing resources that are necessary is difficult.

SUMMARY OF THE INVENTION

From this situation, one object of the present invention is to combine a particle filtering with random jamming processes that are each in accordance with an Epanechnikov kernel, while limiting the computing resources necessary.

A supplementary object of the invention is to provide such a combination that can be used autonomously on board an aircraft. Beyond this, an object of the invention is to contribute to a box-regularized particle filtering method being able to be implemented by a circuit of the FPGA type.

In order to achieve at least one of these objects or another, a first aspect of the invention proposes a novel box particle filtering method for predicting a state of a system by means of a set of state intervals with weights that are associated with these state intervals, so as to form a probability distribution that characterizes the state of the system. The system concerned may be a terrestrial, airborne, maritime or space vehicle that is provided with a navigation system using measurement correlation. The method of the invention comprises repetitively applying a sequence of steps to the set of state intervals with their associated weights for updating these state intervals and weights. This sequence of steps comprises a so-called smoothing step, which consists in modifying at least one of the state intervals by applying random modifications to a set of interval bounds, or center values and interval lengths, which determine this state interval according to state coordinates of the system. According to the invention, the random modifications relating to each state interval to be modified, which is identified by an integer index i, are determined by executing the following steps:

generating a first random value, denoted $\beta_i$ and comprised between 0 and 1, the values 0 and 1 being permitted, according to a statistical-distribution beta law with a first parameter equal to d and a second parameter equal to 2, where d is a number of state coordinates of the system;

generating 2·d second random values, denoted $v_{k,i}$, each according to a normal statistical distribution law with zero mean value and standard deviation equal to unity, where k is another integer index that varies from 1 to 2·d and identifies the interval bounds, or center values and interval lengths, for each state interval;

calculating a first number, denoted $\xi_i$, according to the first formula: $\xi_i = [\Sigma_{k=1 \; to \; 2\cdot d} (v_{k,i})^2]^{1/2}$;

calculating a second number, denoted $\alpha_i$, according to the second formula: $\alpha_i = \beta_i^{1/2}/\xi_i$; and calculating 2·d third numbers, denoted $\varepsilon_{k,i}$, according to the third formula: $\varepsilon_{k,i} = v_{k,i} \cdot \alpha_i$. Then the random modifications that are applied to the state interval i are proportional one-to-one to the third numbers $\varepsilon_{k,i}$, with a proportionality coefficient that is non-zero and common to these random modifications.

The third numbers $\varepsilon_{k,i}$ that are thus generated follow a probability density function of the Epanechnikov kernel type. Furthermore, the aforementioned steps can easily be implemented autonomously by a computing unit, in particular of the FPGA type, which is installed on board a vehicle, without communication with external computing means.

Preferably, all the interval bounds, or center values and interval lengths, which determine the state interval i, may be modified by implementing the following steps:

combining the random modifications that relate to this state interval i using a square matrix of dimension 2·d, so as to obtain 2·d combinations of random modifications; then adding the combinations of random modifications that are thus obtained one-to-one to the interval bounds, or center values and interval lengths, of the state interval i. Furthermore, and preferably, the matrix that is used for combining the random modifications may be such that the product of this matrix multiplied by its transpose is equal to a mean product matrix, where the mean product matrix is square of dimension 2·d, and has as coefficients mean values that are calculated over all the state intervals, of products of the interval bounds, or center values or interval lengths, taken in pairs separately for each state interval.

In preferred embodiments of the invention, each first random value Bi may be generated using an algorithm that combines:

a generation of two random numbers each according to a uniform statistical distribution law; and at least one acceptance criterion that is based on the two random numbers, such that, if the at least one acceptance criterion is satisfied, a first of the two random numbers is used for calculating the first value $\beta_i$, otherwise the generation of the two random numbers is recommenced.

Advantageously, each of the two random numbers may be generated using a method of the shift register type with linear feedback.

Such embodiments allow implementations of the method of the invention by a computing unit that is autonomous, while reducing even further the computing resources of this unit. Furthermore, the first values $\beta_i$ that are thus generated ensure that the random interference that is applied to the state intervals is in accordance with an Epanechnikov kernel. In particular, Cheng's algorithm, known to persons skilled in the art, may be used for generating each first value $\beta_i$.

Independently, each second random value $v_{k,i}$ may be calculated as a sum of several initial random values, each of these initial random values being generated according to a uniform statistical distribution law. In this case, each initial random value can likewise be generated using a method of the linear-feedback shift register type. Such methods for generating second random values $v_{k,i}$ also facilitate implementations of the method of the invention by a computing unit that is autonomous, while further reducing the computing resources of this unit. Furthermore, the second values $v_{k,i}$ that are thus generated also ensure that the random jamming that is applied to the state intervals is in accordance with an Epanechnikov kernel.

Particularly advantageously, respective estimations of each first number $\xi_i$ and/or of each second number $\alpha_i$ may be obtained using the following steps at least once, where X is a positive or zero variable number and $\alpha$ is an exponent value equal to 2 or ½:

/a/ writing the number X in the form $X=(1+m)\cdot 2^{ex}$, where ex is a negative, positive or zero integer, and m is a mantissa comprised between 0 and 1, the value 0 and being permitted, so that a binary representation of the number X is:

$I(X)=L\cdot(m+ex+B)$, where $L=2^n$ with n being a number of bits of a binary writing of the mantissa m, and B being a positive or zero constant number, referred to as bias;

/b/ calculating a binary representation of $X^\alpha$ in the form: $I(X^\alpha)=\alpha\cdot I(X)+L\cdot(1-\alpha)\cdot(B-\sigma)$, where $\sigma$ is a constant number the value of which is recorded; and /c/ obtaining the estimation of the value of $X^\alpha$ from the binary representation $I(X^\alpha)$.

Steps /a/-/c/ are then applied to $X=\Sigma_{k=1 \text{ à } 2\cdot d}(v_{k,i})^2$ with $\alpha=\frac{1}{2}$, to obtain an estimation of the first number $\xi_i$.

Steps /a/-/c/ may optionally be applied previously to an absolute value of each second random value, according to $X=|v_{k,i}|$, with $\alpha=2$.

Steps /a/-/c/ may also be applied to $X=\beta_i$ with $\alpha=\frac{1}{2}$, to obtain an estimation of the second number $\alpha_i$ as a result of a division of the estimation of $\beta_i^{1/2}$ that is thus obtained by the estimation of the first number $\xi_i$.

Such calculations, which on each occasion replace the estimation of the function of Xa by a calculation based on the binary representation of the number X, are particularly economical in computer resources, and short in terms of computing time. Furthermore, they can also be performed by a circuit of the FPGA type.

In these advantageous implementations of the invention that use binary representations of the numbers, at least one of the following additional features may be reproduced, alone or in combination of a plurality of them:

the number n of the bits of the binary writing of the mantissa m may be equal to 23, and the bias B may be equal to 127;

the constant number $\sigma$ may be between 0 and 1, preferably between 0 and 0.5; and the obtaining of the estimation of the binary value of $X^\alpha$ may be completed by at least once executing the following additional step, after the step /c/:

/d/ calculating a new estimation of the value of $X^\alpha$ from a prior estimation of the value of $X^\alpha$, by applying an approximate equation resolution recursive algorithm to the equation $Y^{1/\alpha}-X=0$ of unknown Y, the estimation of the value of $X^\alpha$ that was obtained at the step /c/ being used as prior estimation for a first application of the algorithm, and the new estimation of the value of $X^\alpha$ that is produced by a $q^{th}$ application of the algorithm forming the prior estimation of the value of $X^\alpha$ for the $(q+1)^{th}$ application of the algorithm, if such a $(q+1)^{th}$ application of the algorithm is carried out, q being an integer greater than or equal to 1. For example, the approximate equation resolution recursive algorithm that is used at the step /d/ may be Newton's method.

Generally for the invention, the sequence of steps that is applied repetitively for updating the state intervals with the weights that are associated therewith may comprise the following steps /1/ to /5/:

/1/ a prediction step, comprising predicting subsequent state intervals, each subsequent state interval being obtained by applying at least one propagation rule to one of a plurality of prior state intervals;

/2/ a step of measuring a true state of the system;

/3/ a step of contracting at least one of the subsequent state intervals, according to at least one result of measuring the true state that was obtained at step /2/;

/4/ a weight updating step, comprising allocating a weight to each subsequent state interval according to a size of this subsequent state interval as resulting from step /3/, a size of the subsequent state interval as resulting from step /1/ before step /3/, and a weight of the prior state interval from which the subsequent state interval resulted during step /1/; and /5/ a step of redistributing the state intervals, comprising replacing at least one of the subsequent state intervals by a plurality of sub-intervals that result from a division of the subsequent state interval, each sub-interval forming a new state interval, this redistribution step comprising applying the smoothing step to at least each new state interval.

Then the state intervals as resulting from an implementation of the sequence of steps /1/-/5/, comprising the new state intervals and subsequent state intervals that were kept without being replaced by a plurality of new state intervals, including optionally certain state intervals to which the smoothing step cannot have been applied, constituting the prior state intervals for a following implementation of the sequence of steps /1/ to /5/.

A second aspect of the invention proposes a computing unit, this computing unit comprising at least one first input that is adapted for receiving results of repeated measurements of acceleration and angular velocity of a system, and a second input that is adapted for receiving results of repeated measurements of a true state of the system, supplementary with respect to the acceleration and angular velocity measurements. The computing unit is then arranged for implementing a box-regularized particle filtering method that is in accordance with the first aspect of the invention. In this way, the computing unit outputs a series of state intervals with respective weights, the weight that is associated with each of the state intervals corresponding to a probability of the true state of the system being in this state interval.

Such a computing unit may be one of the following types:
field programmable gate array, or FPGA,
fixed-gate network circuit, known by the acronym DSP, standing for "Digital Signal Processor", and
central processing unit, known by the acronym CPU standing for "Computer Processing Unit" or RISC standing for "Reduced Instruction Set Computer".

A third aspect of the invention relates to a navigation system using measurement correlation, which is adapted for being installed on board a vehicle and which comprises:
- an inertial unit, which is adapted for iteratively measuring accelerations and angular velocities of the vehicle, and for deducing, by using results of measurements of accelerations and angular velocities, subsequent state intervals respectively from a plurality of prior state intervals, each state of the vehicle comprising position, speed and attitude coordinates of this vehicle;
- a measurement system, which is adapted for iteratively measuring at least one feature of a true state of the vehicle; and
- a computing unit that is in accordance with the second aspect of the invention, and which is adapted for reducing at least one position, speed and/or attitude drift of the inertial unit, using the results of measurement of the feature of the true state of the vehicle that are delivered by the measurement system.

Finally, a fourth aspect of the invention proposes a vehicle that comprises a navigation system using measurement correlation in accordance with the third aspect of the invention. Such a vehicle may be an aircraft, in particular an airplane, a flying drone or any self-propelled air carrier, or a vehicle capable of moving on the ground, in particular a drone able to move on the ground, or a ship, a submarine, a spacecraft, in particular a space probe, a satellite, etc., without limitation. According to the circumstances, the measurement system may be a telemetry sensor that is intended to measure a distance between the vehicle and a point on the ground, a system for locating seamarks or stars, a sonar measuring a height of water under the ship or the submarine, etc.

BRIEF DESCRIPTION OF THE DRAWINGS

The features and advantages of the present invention will emerge more clearly in the following detailed description of non-limitative example embodiments, with reference to the accompanying figures, among which.

DESCRIPTION OF THE PREFERRED EMBODIMENTS

Figure 1:
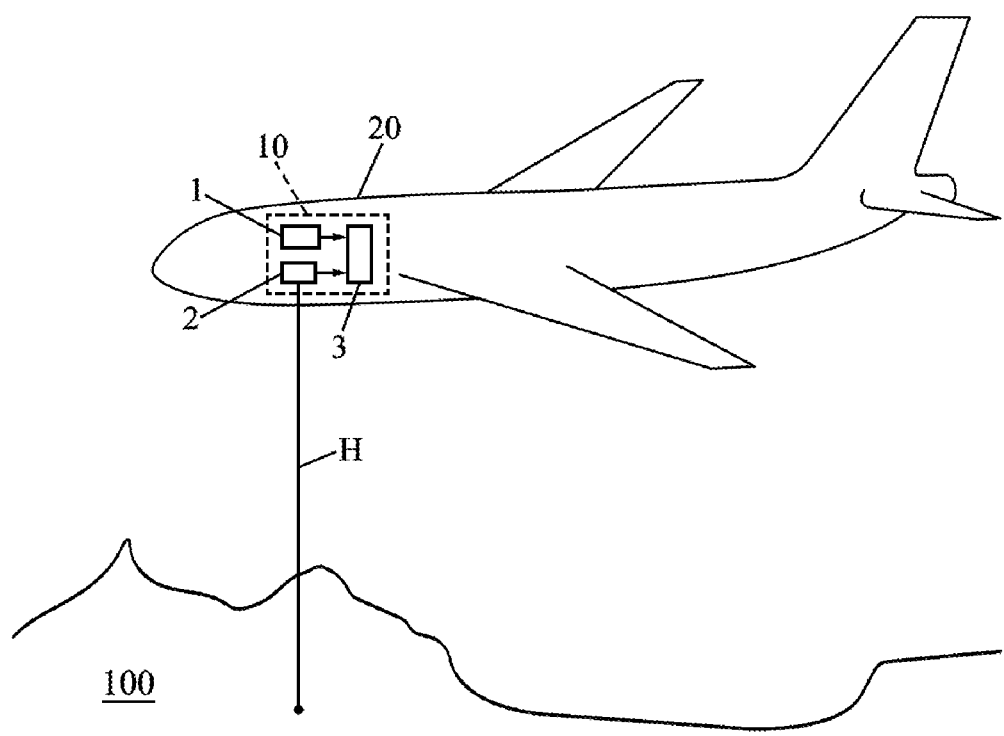
FIG. 1 shows an aircraft that is equipped with an inertial unit using terrain correlation according to the invention.

For clarity sake, the dimensions of the elements that are shown symbolically in FIG. 1 correspond neither to real dimensions nor to ratios of real dimensions. Furthermore, the invention is described by way of non-limitative example for a case of application to an aircraft, but it is understood that it can be applied to any vehicle that is provided with a navigation system using measurement correlation, whether this vehicle be terrestrial, airborne, maritime, space, etc.

A method for calculating an estimation of the value of $X^\alpha$ that can be used in the invention is described first. X is a number of variable value, positive or zero, and $\alpha$ designates an exponent that can be equal to 2 or ½.

In a known manner, the number X can be written uniquely in the following form, in accordance with IEEE 754:

$$X=(1+m)\cdot 2^{ex},$$

where ex is a positive or zero integer, and m is a mantissa comprised between 0 and 1, the value zero also being permitted. The number ex and the mantissa m thus depend on the value of the number X.

This thus gives $$\log_2 X = ex + m + \sigma,$$

where $\sigma$ is a fixed real number making it possible to minimize an error of the value of $\log_2 X$, in particular when a numeric interval thereof is known a priori for the number X. For example, the value of the number $\sigma$ may be taken to be equal to 0.043036. And therefore:

$$ex+m=\log_2 X-\sigma.$$

Moreover, the number X can be represented in binary form by I(X) defined by:

$$I(X)=L\cdot(m+ex+B),$$

where $L=2^n$, with n being a number of bits set for writing the mantissa m in binary form, and B is a positive or zero constant number, which is referred to as bias. In the representation I(X) of the number X, L, m, ex and B are expressed in binary form. For example, n may be equal to 23, and B may be equal to 127. By transferring into the binary representation I(X) the expression of ex+m as coming from $\log_2 X$, this gives:

$$I(X)=L\cdot[\log_2 X-\sigma+B], \text{ i.e.: } \log_2 X=I(X)/L+\sigma-B.$$

However, in the same way as I(X) in the previous line, the binary representation of $X^\alpha$ is:

$$I(X^\alpha)=L\cdot[\log_2(X^\alpha)-\sigma+B]$$

However, $\log_2(X^\alpha)=\alpha\cdot\log_2(X)$, therefore: $I(X^\alpha)=L\cdot[\alpha\cdot\log_2(X)-\sigma+B]$, and, by replacing $\log_2(X)$ with its expression as a function of the binary representation I(X), this gives:

$$I(X^\alpha)=L\cdot[\alpha\cdot(I(X)/L+\sigma-B)-\sigma+B], \text{ i.e.: } I(X^\alpha)=\alpha\cdot I(X)+L\cdot(1-\alpha)\cdot(B-\sigma).$$

An approximate value of $X^\alpha$, denoted $Y_0$, can then be reconstructed from the binary representation of Xa that was thus obtained, using a method that is the inverse of the one that supplies the binary representation of a number from this number. The difference between this approximate value $Y_0$ and the true value of $X^\alpha$ depends on the value that was adopted for the number $\sigma$. For many applications, the approximate value $Y_0$ is suitable in a satisfactory manner for replacing $X^\alpha$, considering the simplicity of the method for obtaining this approximate value $Y_0$, as has just been described.

For the particular case where the exponent $\alpha$ is equal to 2:

$$I(X^2)=2\cdot I(X)-L\cdot(B-\sigma).$$

For the particular case where the exponent $\alpha$ is equal to ½:

$$I(X^{1/2})=I(X)/2+0.5\cdot L\cdot(B-\sigma).$$

For applications where the approximate value $Y_0$ does not constitute a sufficiently precise evaluation of $X^\alpha$, it is possible to improve this evaluation by using one of the methods for refining approximate values that are known to a person skilled in the art. Newton's algorithm, also referred to as Newton's method, may be used in particular, by applying it to the function $f(Y)=Y^{1/\alpha}-X$ and to the equation $f(Y)=0$. Successive approximate values $Y_q$, q being an integer index for numbering these values, can thus be obtained according to the formula: $Y_{q+1}=Y_q-f(Y_q)/f'(Y_q)$, where $f'(Y_q)$ is the value of the function derived from f, estimated for the value $Y_q$. That is, when calculating the expression of f'(Y) from the expression of f(Y):

$$Y_{q+1}=(1-\alpha)\cdot Y_q+\alpha\cdot X\cdot Y_q^{(\alpha-1)/\alpha}, \text{ for } q=0,1,2,\ldots$$

For the particular case where the exponent $\alpha$ is equal to 2, this gives:

$$Y_{q+1}=-Y_q+2\cdot X\cdot Y_q^{1/2}.$$

In particular, the first-order approximate value of $X^2$ is:

$$Y_1=-Y_0+2\cdot X\cdot Y_0^{1/2}.$$

The value of $Y_q^{1/2}$ can be estimated each time using the formula $I(X^\alpha)=\alpha\cdot I(X)+L\cdot(1-\alpha)\cdot(B-\sigma)$, and by replacing in this formula X by $Y_q$ and $\alpha$ by ½.

For the particular case where the exponent $\alpha$ is equal to ½, this gives:

$$Y_{q+1}=0.5\cdot Y_q+0.5\cdot X/Y_q.$$

In particular, the first-order approximate value of $X^{1/2}$ is:

$$Y_1=0.5\cdot Y_0+0.5\cdot X/Y_0.$$

The approximate value $Y_0$, as obtained using the binary representations of numbers, and the values $Y_q$, $_{q\geq 1}$, as obtained using one of the methods for refining approximate values such as Newton's method, does not require extensive computing resources. They can therefore be calculated easily by a computing unit of the FPGA, DSP, CPU or RISC type.

In accordance with FIG. 1, an aircraft 20 is equipped with a navigation unit using terrain correlation, designated by the reference 10. The navigation unit 10 comprises an inertial unit 1, a telemetry sensor 2 and a computing unit 3. In a known manner, the inertial unit 1 repetitively makes measurements of three acceleration coordinates and of three angular velocity coordinates of the aircraft 20, by means of accelerometers and gyrometers, not shown. Moreover, the telemetry sensor 2 repetitively makes measurements of the distance H that exists between the ground 100 and the aircraft 20. This distance H is measured in a direction that may be fixed with respect to the aircraft 20, for example perpendicular to a reference plane of the aircraft. Optionally, the telemetry measurement direction may be variable with respect to the aircraft 20, but in such case this measurement direction is controlled and taken into account in a suitable manner, and known moreover. The distance H therefore varies depending on the terrestrial relief over which the aircraft 20 is flying, and also depending on its altitude and attitude. Hereinafter, the present description is limited solely to the case where the measurements that are supplementary with respect to those of the inertial unit 1 consist of the measurements of the distance H. This case corresponds to a navigation with terrain correlation. However, it is understood that other supplementary measurements may be used alternatively to those of the distance H, or in addition to them. Finally, the invention is compatible with inertial unit and telemetry sensor models as commercially available. In particular, the inertial unit may be of an MEMS type, standing for "Micro-Electro-Mechanical System", of the quadrason type, of the gyrolaser type, etc., and the telemetry sensor may be a radio altimeter, a laser telemeter, etc.

Each possible state for the aircraft 20 may be composed of three spatial coordinate values that identify a position for the aircraft, for example in the terrestrial reference frame, three velocity values, each according to one of the spatial coordinates, and three angular values for identifying an orientation of the aircraft, for example three Euler angle values, for a total of nine state coordinates. Under these conditions, a state interval for the aircraft 20 is formed by a combination of nine unidimensional intervals that each relate separately to one of the state coordinates. Such a state interval is referred to as a box in the jargon of a person skilled in the art.

The box-regularized particle filtering method is initialized by the supply of several initial state intervals, each associated with a weight that indicates a probability of the true state of the aircraft 20 being located initially in this initial state interval. Thus, N initial state intervals are supplied, N being an integer, for example equal to 16 or 32, preferably less than or equal to 128. Each initial state interval is individually associated with a weight value, which may be equal to 1/N.

The method next consists in successive iterations of a sequence of steps, each new implementation of the sequence of steps producing an updating of state intervals, with updated values of weights that are associated one-to-one with the updated state intervals. Furthermore, each new implementation of the sequence of steps is executed from the state intervals and their associated weight values as supplied by the just prior implementation of the sequence of steps.

Figure 2:
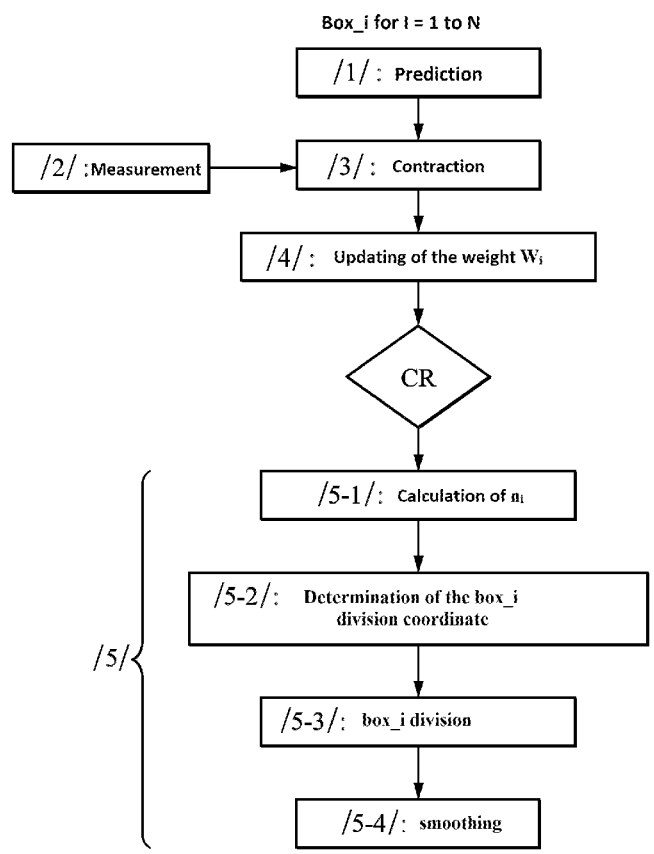
FIG. 2 is a diagram that shows the concatenation of steps of a method according to the invention.

Each sequence of steps comprises a prediction step denoted /1/ in FIG. 2, a measurement step denoted /2/, a contraction step denoted /3/, a step /4/ of updating the weight of each state interval, and a step /5/ of redistribution of the state intervals. Steps /1/ and /3/ to /5/ are implemented for each state interval. Since step /5/ produces a redistribution of the state intervals as resulting from step /3/, it is preferably implemented so as to keep a constant number of state intervals. Then the computing unit 3 can be designed and sized to process N state intervals at each implementation of the sequence of steps /1/ to /5/. i is an integer index from 1 to N, which counts the state intervals that are processed at each iteration of this sequence of steps /1/ to /5/.

For each state interval i, denoted box_i, the prediction step /1/ consists in collecting the results of last measurements of acceleration and angular velocity, as delivered by the inertial unit 1. Optionally, the results of several measurements that were made by the inertial unit 1 since the previous implementation of the sequence of steps /1/ to /5/ can be collected. For each of the box_i state intervals, this step /1/ also comprises calculating a change in this state interval during the period of time that has elapsed between the two implementations of the step /1/, relating to the box_i state interval, from the results of the measurements of acceleration and angular velocity, is assumed to be known to a person skilled in the art. In this regard reference can be made to the article by Merlinge, N., Dahia, K., Piet-Lahanier, H., Brusey, J., & Horri, N., which is entitled "A Box Regularized Particle Filter for state estimation with severely ambiguous and non-linear measurements", Automatica (2019), Vol. 104, pp. 102-110. This step /1/ results in a translation, usually accompanied by a change in length, of each unidimensional interval that relates to one of the state coordinates of the aircraft 20. In the general part of the present description, each box_i state interval as existing at the moment of starting the execution of step /1/ has been called prior state interval, and this box_i state interval as modified by the step /1/ has also been called subsequent state interval.

The measurement step /2/ consists in collecting the result of the last distance measurement H as delivered by the telemetry sensor 2. Optionally, the results of a plurality of last measurements that were made by the telemetry sensor 2 since the previous execution of step /2/, at the time of the previous iteration of the sequence of steps /1/ to /5/, may be collected.

The contraction step /3/ consists in reducing the size of each box_i state interval according to any incompatibilities that might exist between parts of this state interval and the last result or results of distance measurement H collected at step /2/. Typically, the six position and attitude coordinates of the aircraft 20, such as possibly varying within each box_i state interval resulting from step /1/, are combined with relief height values read in a terrain map that is stored, in order to obtain an estimation of the distance H associated with each state. Such calculation may be carried out in the known manner that has been reminded at the start of this description. The distance H thus estimated is compared with the result of the measurement of step /2/. Generally, an implicit equation can be used for converting each state of the aircraft 20 into a distance value H, using the terrain map stored. However, such equation, referred to as an observation equation by a person skilled in the art, may be difficult to invert locally, so that modeling its inverse function by an analytical function part and a tabulated function part may be advantageous. A person skilled in the art will also be able to refer to the article by Merlinge et al., Automatica 104 (2019), cited above, with regard to step /3/, to which the improvement to the method procured by the invention does not directly relate.

The updating step /4/ consists in updating the value of the weight of each state interval as resulting from step /3/. For example, a new value of the weight of the box_i state interval may be equal to the value of the weight of this box_i state interval as existing before implementing this update, multiplied by the size of the box_i state interval as resulting from the contraction step /3/, and divided by the size of the box_i state interval as resulting from the prediction step /1/ before applying the contraction step /3/. Other formulae for updating the weight values may be adopted alternatively. Optionally, the weight values as resulting from one of these formulae may also be corrected, for example by multiplying them by a non-zero common factor, to ensure that the sum thereof is equal to unity.

The purpose of step /5/ is to redistribute the state intervals as resulting from step /3/, to obtain a better statistical representativeness of the states that are possible for the aircraft 20. The implementation of this step /5/ may be subject to the result of an optional test designated by CR in FIG. 2. This test consists in determining whether a representativeness criterion is satisfied for the state intervals with their respective weight values. It relates to all the values of the weights $w_i$ as updated at step /4/, where $w_i$ is the weight that is associated with the box_i state interval. A first representativeness criterion that may be used is the one known by the term N-effective criterion. This criterion is satisfied if $(\Sigma_{i=1\ldots N} w_i^2)^{-1} < \theta_{eff} \cdot N$, where $\theta_{eff}$ is an adjustment parameter of the N-effective criterion, comprised between 0 and 1. Another representativeness criterion that is also possible is the one that is known by the term entropic criterion: it is satisfied if $\log(N) + \Sigma_{i=1\ldots N} w_i \cdot \log(w_i) > \theta_{ent} \cdot N$, where $\theta_{ent}$ is an adjustment parameter of the entropic criterion, comprised between 0 and 1. However, other representativity criteria that are also known to a person skilled in the art may also be used alternatively. Step /5/ of redistribution of the state intervals is then applied if the representativeness criterion is not satisfied.

Step /5/ first comprises determining a division number $n_i$ that is attributed to the box_i state interval, with the index i also numbering the state intervals from 1 to N. This sub-step is denoted /5-1/ in FIG. 2. In a known manner, it can be executed using a multinomial drawing method. Such a method consists in drawing points randomly and repetitively within a unidimensional segment, to determine the number $n_i$ of sub-intervals that are intended to replace the box_i state interval, according to the values of the weights $w_i$ of all the state intervals as updated at step /4/. The drawing segment is formed by a juxtaposition of base segments, the individual lengths of which correspond one-to-one to the values of the weights of the state intervals. The number $n_i$ of sub-intervals that will replace the box_i state interval is then proportional to the number of randomly drawn points that belong to the base segment whose the length is equal to the weight value of the box_i state interval. If the value of $n_i$ that is determined for one of the state intervals is zero, this state interval is suppressed, otherwise the box_i state interval is divided into $n_i$ sub-intervals, the value obtained for $n_i$ being statistically all the greater, the higher the weight of the box_i state interval as resulting from step /4/. Optionally, the values of $n_i$ that are thus obtained may be multiplied by a constant factor and rounded, in order to limit the total number of sub-intervals used, and/or to ensure that the sum of all the values of $n_i$ is equal to N. However, this way of implementing sub-step /5-1/ is provided only by way of example, and different methods may be used alternatively in variant embodiments of the invention.

Each box_i state interval is then intended to be divided into $n_i$ sub-intervals, at sub-step /5-3/, for example in one of the ways that are described in the following articles: "An introduction to box particle filtering [lecture notes]" by Gning, A., Ristic, B., Mihaylova, L., & Abdallah, F., IEEE Signal Processing Magazine (2013), Vol. 30 (4), pp. 166-171; and "A Box Regularized Particle Filter for state estimation with severely ambiguous and non-linear measurements" by Merlinge, N., Dahia, K., Piet-Lahanier, H., Brusey, J., & Horri, N., Automatica (2019), Vol. 104, pp. 102-110, already cited above.

These division methods consist in first determining which one of the state coordinates of the system is that where the box_i state interval is the most extended. This determination is the object of sub-step /5-2/, which is now described.

Each of the state intervals box_i relates to a plurality of state coordinates of at least two different types. For example, in case of the navigation unit 10 that was described above for the aircraft 20, the three position coordinates, denoted $x_1$, $x_2$ and $x_3$, are state coordinates of a first type, the three speeds, denoted $v_1$, $v_2$ and $v_3$, are state coordinates of second type, and the three attitude angles, denoted $\theta_1$, $\theta_2$ and $\theta_3$, of the aircraft 20 are state coordinates of a third type. Thus normalized dimensionless values of the lengths of the unidimensional intervals of the box_i state interval, according to each of the state coordinates, are:

$$\Delta x_{j\_n} = \Delta x_j \cdot (\Delta x_1^2 + \Delta x_2^2 + \Delta x_3^2)^{-1/2},$$

$$\Delta v_{j\_n} = \Delta v_j \cdot (\Delta v_1^2 + \Delta v_2^2 + \Delta v_3^2)^{-1/2}, \text{ and}$$

$$\Delta \theta_{j\_n} = \Delta \theta_j \cdot (\Delta \theta_1^2 + \Delta \theta_2^2 + \Delta \theta_3^2)^{-1/2},$$

for j=1, 2 and 3 in each case, where $\Delta x_j$, $\Delta v_j$ and $\Delta \theta_j$ are lengths of the respective unidimensional intervals of the nine state coordinates for the box_i state interval. Each of the values $\Delta x_j^2$, $\Delta v_j^2$ and $\Delta \theta_j^2$ can be calculated using the method that was presented above for $X^\alpha$, with $\alpha$ equal to 2. Then each of the factors $(\Delta x_1^2 + \Delta x_2^2 + \Delta x_3^2)^{-1/2}$, $(\Delta v_1^2 + \Delta v_2^2 + \Delta v_3^2)^{-1/2}$ and $(\Delta \theta_1^2 + \Delta \theta_2^2 + \Delta \theta_3^2)^{-1/2}$ can also be calculated using the same method, but with a then being equal to $-\frac{1}{2}$. The normalized values $\Delta x_{j\_n}$, $\Delta v_{j\_n}$ and $\Delta \theta_{j\_n}$ of the lengths of the new unidimensional intervals of the box_i state interval are then obtained in accordance with previous formulae, by calculation of products.

These normalized values $\Delta x_{j\_n}$, $\Delta v_{j\_n}$ and $\Delta \theta_{j\_n}$ can be compared with each other, and the state coordinate where the box_i state interval is the most extended is the one that corresponds to the highest of the normalized values $\Delta x_{j\_n}$, $\Delta v_{j\_n}$ and $\Delta \theta_{j\_n}$, considering their absolute values. For example, the box_i state interval is the most extended according to the position coordinate $x_1$ if $\Delta x_{1\_n}$ is the highest of the normalized values $\Delta x_{j\_n}$, $\Delta V_{j\_n}$ and $\Delta \theta_{j\_n}$, or it is the most extended according to the speed coordinate $v_2$ if $\Delta v_{2\_n}$ is the highest of the nine normalized values, etc.

At sub-step /5-3/, the box_i state interval is divided into $n_i$ contiguous sub-intervals, by dividing, into $n_i$ segments with the same lengths, that one of the unidimensional intervals of box_i that is the most extended, within the meaning of the normalized values $\Delta x_{j\_n}$, $\Delta v_{j\_n}$ and $\Delta \theta_{j\_n}$. Each sub-interval therefore has one of these segments as a unidimensional interval along the state coordinate that corresponds to the maximum extension of the box_i state interval, and the same unidimensional intervals as this box_i state interval along the other state coordinates. The $n_i$ sub-intervals that are thus constructed therefore constitute a partitioning of the box_i state interval. They form new state intervals from which the box-regularized particle filtering is continued. A weight value is attributed to each of them, which is equal to that of the box_i state interval divided by the division number $n_i$. These new state intervals, with those of the state intervals that have not been divided, are then re-numbered by the index i, advantageously from 1 to N, to continue the filtering method.

Finally, sub-step /5-4/, which was referred to as smoothing step in the general part of the present description, consists in correcting the new state intervals as resulting from sub-step /5-3/, so that they produce, with their associated weight values, an even better statistical representation of the state of the system, i.e. of the state of the aircraft 20 for the example in question. Such a modification of the state intervals is also commonly referred to as regularization of the statistical representation of the state of the system, in the jargon of a person skilled in the art. It can be applied not only to the new state intervals that each resulted from a division of one of the subsequent state intervals, but also to all the state intervals, including those that have not been divided. Corrections that are applied for this to the state intervals may consist of random shifts of the bounds of the unidimensional intervals that constitute the edges of each box_i state interval. Preferably, the respective weight values that are associated with the state intervals are not modified in this sub-step /5-4/. For the invention, a smoothing method by Epanechnikov kernel is applied, in particular as described in the article by Merlinge et al., Automatica 104 (2019), already cited.

In a known manner, the Epanechnikov kernel is defined by the probability density function $f(x)=3\cdot(1-x^2)/4$, where x is the random variable comprised between −1 and 1, the values −1 and 1 being permitted. Its average value is zero, and its variance is equal to ⅕.

Figure 3:
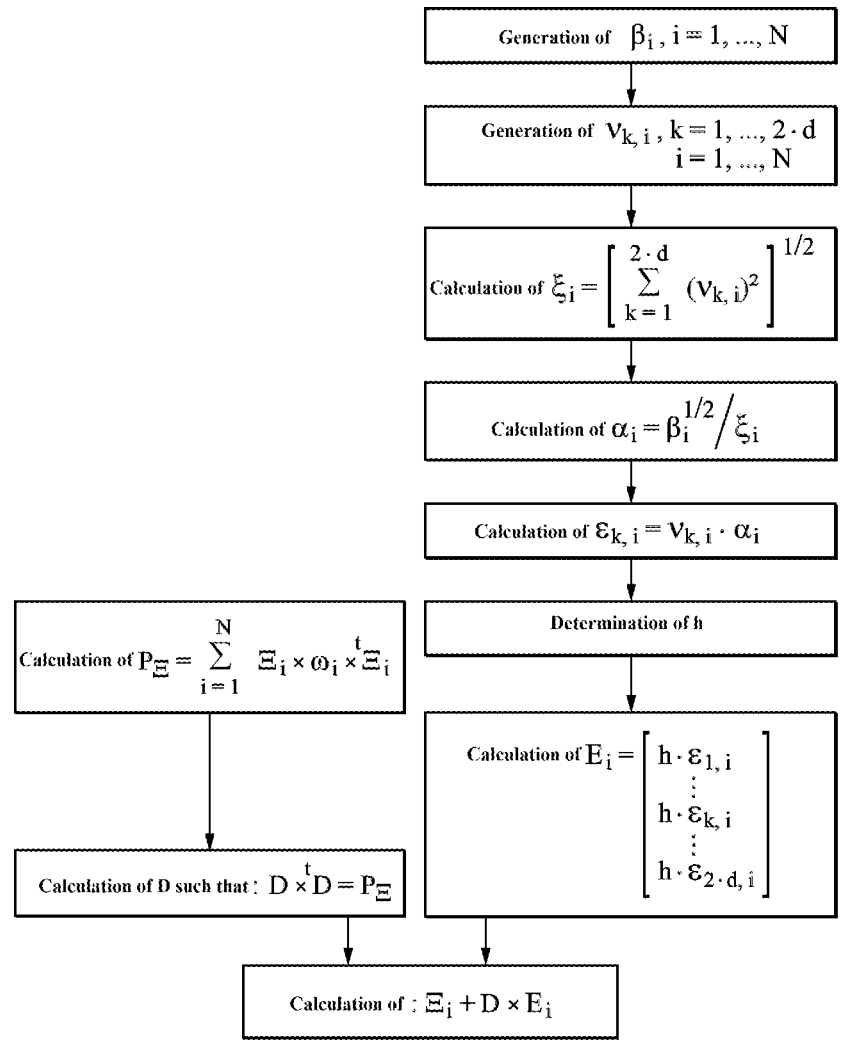
FIG. 3 is a diagram that details the implementation of a smoothing step according to the invention.

Sub-step /5-4/ therefore initially comprises generating random corrections to be applied to each unidimensional state-coordinate interval that each determines box_i state intervals, and then applying these corrections. A detailed implementation of sub-step /5-4/ is shown in FIG. 3.

The number of state coordinates of the system in question is denoted d, and the number of bounds that determine each state interval of this system, i.e. each box used in the regularized particle filtering method, is denoted d'=2·d. In the case of the aircraft 20, d=9 and d'=18.

N first random values are first generated, denoted $\beta_i$ and comprised between 0 and 1, the values 0 and 1 being permitted, i being the integer index of numbering of the state intervals as used previously, each according to a statistical distribution beta law, with first parameter equal to d and second parameter equal to 2. In a known manner, the beta law the parameters of which are d and 2 is defined by the probability density function $x^{d/2-1}\cdot(1-x)\cdot\Gamma(d/2+2)/[\Gamma(d/2)\cdot\Gamma(2)]$, where x designates the random variable, and $\Gamma$ designates the gamma function. One possible way of generating the values $\beta_i$ in accordance with the beta law uses Cheng's algorithm, which will be reminded below, with reference to [FIG. 4].

Next N·d' second random values are generated, denoted $v_{k,i}$, i also being the same index previously and k being another integer index that varies from 1 to d', each according to a normal statistical distribution law with zero mean value and standard deviation equal to unity, commonly referred to as reduced normal law. The index k counts the degrees of freedom in the definition of each state interval. It identifies two unidimensional interval bounds for each state coordinate or, in an equivalent manner, a center value and an interval length for each unidimensional state-coordinate interval. In a known manner, the normal law with zero mean value and standard deviation equal to unity is defined by the probability density function $(1/\pi^{1/2})\cdot\exp[-x^2/2]$, where x also designates the random variable, but in this case positive, zero or negative. It can be simulated by a sum of initial random values that are each generated according to a uniform statistical distribution law, and such a uniform statistical distribution law can be produced by a method of the LFSR type, standing for "linear feedback shift register", for example.

N first numbers, denoted $\xi_i$, are then calculated from the random values $v_{k,i}$ in the following manner: $\xi_i=[\Sigma_{k=1 \text{ à } d'} (v_{k,i})^2]^{1/2}$. Advantageously, each of these numbers $\xi_i$ can be calculated by applying the method for calculating an estimation of $X^\alpha$ that was described above, to $X=v_{k,i}$ with $\alpha=2$, then to $X=\Sigma_{k=1 \text{ à } d'} (v_{k,i})^2$ with $\alpha=\frac{1}{2}$.

N second numbers, denoted $\alpha_i$, are next calculated according to the formula: $\alpha_i=\beta_i^{1/2}/\xi_i$. Advantageously, each of these numbers di can be calculated by once again applying the method for calculating an estimation of $X^\alpha$ that was described above, to $X=\beta_i$ with $\alpha=\frac{1}{2}$.

Under these conditions, N·d' third numbers that are calculated in the following manner: $\varepsilon_{k,i}=v_{k,i}\cdot\alpha_i$, each satisfy the Epanechnikov statistical distribution law of zero average value and of variance equal to ⅕.

Moreover, a noise amplitude, denoted h, is calculated in the following manner:

$$h=\mu\cdot A\cdot N^{-1/(d'+4)},$$

where $A=[8\cdot c_d'^{-1}\cdot(d'+4)\cdot(2\cdot\pi^{1/2})^{d'}]^{1/(d'+4)}$. In this expression of A, $c_d'$ designates the volume of the hypersphere of dimension d' and of unitary radius, and $\mu$ is an adjustment parameter that is comprised between 0 et 1. In a known manner, $c_{d'}=\pi^{d'/2}/\Gamma(d'/2+1)$, where $\Gamma$ again designates the gamma function. The value of $c_{d'}$ can either be precalculated and stored so as to be available for the computing unit 3, or be calculated by the latter, for example using a prerecorded table of values of the gamma function. The adjustment parameter $\mu$ makes it possible to control a trade-off between the efficiency of the random smoothing and efficacy of the particle filter. This is because the efficiency of the particle filter results from a continuity of the possible trajectories for the system, described by the trajectories of the state intervals that are maintained during a plurality of successive implementations of the sequence of steps /1/ to /5/. On the other hand, random smoothing produces jamming of these trajectories. The value of the parameter µ can be fixed initially for the method to be executed by the computing unit 3. It depends in particular on the numbers N and d. For example, the adjustment parameter µ may be taken equal to 0.1. The use of the adjustment parameter µ is in particular described in the thesis of Merlinge, N., entitled "State estimation and trajectory planning using box particle kernels", Paris-Saclay University, 2018.

The random modifications to be applied to the box_i state interval are then $h \cdot \varepsilon_{k,i}$, where k identifies the state coordinate bounds, or the center values or lengths of state coordinate intervals. These modifications can be arranged in the form of a vector $E_i$, such that $E_i = [h \cdot \varepsilon_{k,i}]_{k=1, \ldots, d'}$.

A possible method for applying the random modifications to the state intervals that result from sub-step /5-3/ is now described.

For this purpose, it is possible to represent each box_i state interval by a vector $\Xi_i$ of height d', the coordinates of which contain the bounds of all the unidimensional state coordinate intervals for this state interval, or the center values and the lengths of its unidimensional intervals. Then the randomly modified values of the vector $\Xi_i$ can be obtained by replacing this vector $\Xi_i$ by $\Xi_i + D \times E_i$, where D is a square matrix of dimension d' such that the product of D multiplied by the transpose of D is equal to $\Sigma_{i=1 \text{ à } N} \Xi_i \cdot w_i \cdot {}'\Xi_i \cdot D \times 'D = \Sigma_{i=1 \text{ à } N} \Xi_i \cdot w_i \cdot {}'\Xi_i$, where $w_i$ is the weight value of the box_i state interval. For example, the matrix D can be determined by Cholesky's method, which is well-known to a person skilled in the art so that it is not necessary to describe it again here. Under these circumstances, the vector $\Xi_i$ is to be replaced by the vector $\Xi_i + D \times E_i$, for applying the random variations according to the Epanechnikov kernel to the unidimensional intervals of state coordinates of the box_i state interval. All the vectors $\Xi_i + D \times E_i$ determine all the new state intervals that result from the modification by smoothing. In the general part of the present description, the square matrix $\Sigma_{i=1 \text{ to } N} \Xi_i \cdot w_i \cdot {}'\Xi_i$, of dimension d' has been called the mean product matrix. Its coefficients are the mean values calculated over all the state intervals in question, of products of interval bounds, or center values or interval lengths, taken in pairs separately for each state interval.

The method that has just been described for applying, at sub-step /5-4/, a smoothing by Epanechnikov kernel to the sub-intervals as resulting from sub-step /5-3/, is implemented by the computer unit 3 of the navigation system using measurement correlation 10.

The updated state intervals, as resulting from the sub-step /5-3/or from sub-steps /5-4/, with their associated weight values, constitute the result of the box-regularized particle filtering method for an implementation of the sequence of steps /1/ to /5/. A plurality of iterations are chained recurrently, each new iteration from the results of the previous iteration. The iteration that is implemented last supplies an updated probability distribution that characterizes the true state of the aircraft 20. Furthermore, the updated state intervals that result therefrom, associated with their respective weight values, are to be used as prior state intervals for a new implementation of the sequence of steps /1/ to /5/.

Figure 4:
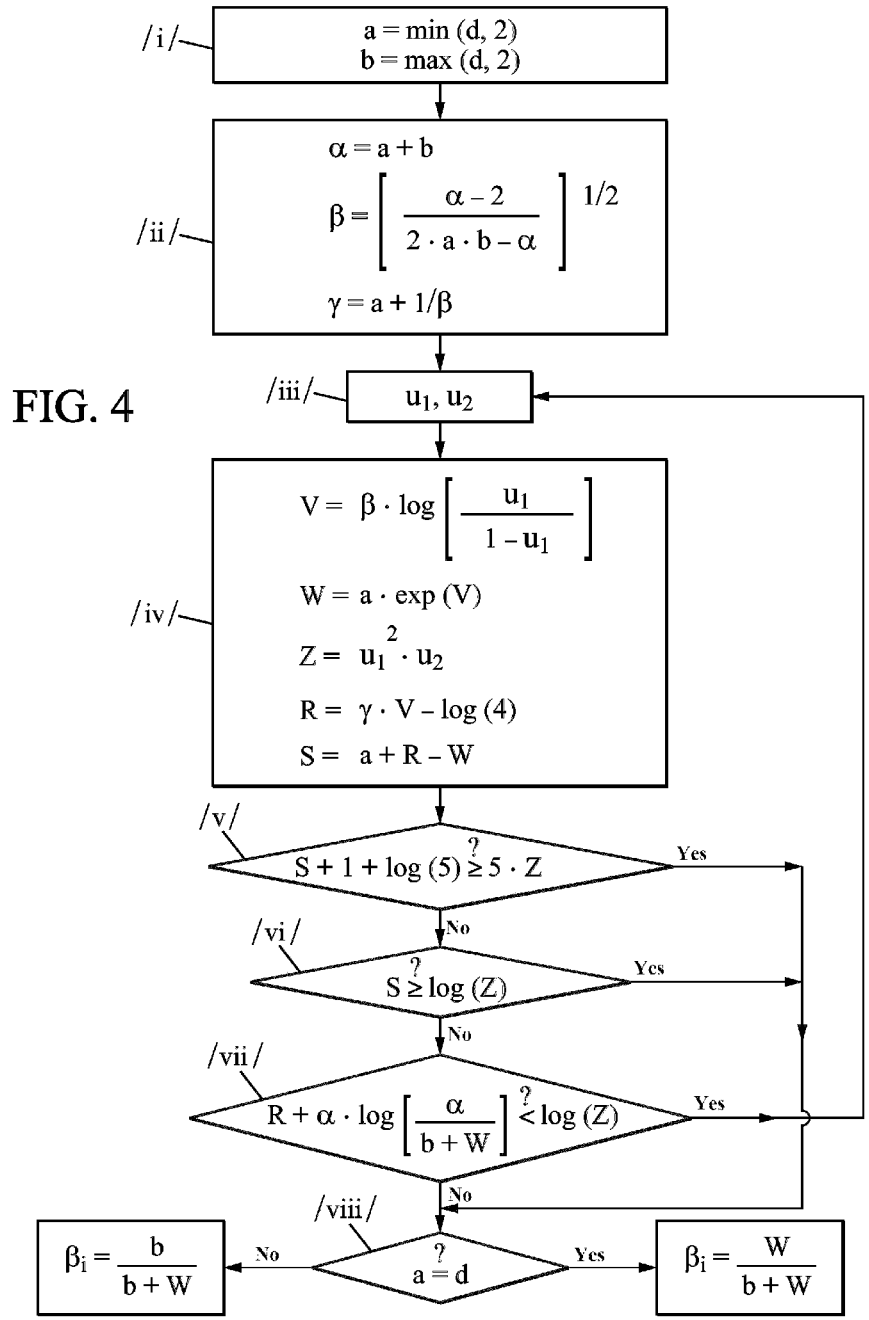
FIG. 4 is a flow diagram of an algorithm that can be used for implementing the invention.

A description is now given, with reference to FIG. 4, of a method for generating each random value $\beta_i$, so as to satisfy the Beta(d, 2) statistical distribution law. This method corresponds to Cheng's algorithm, published in the article entitled "Generating beta variates with non-integral shape parameters", Communications of the ACM, 21(4), pp. 317-322, 1978.

For this purpose, the following numbers a and b are first determined at step /i/:
a, which is equal to the minimum value between d and 2: a=min(d, 2), and
b which is equal to the maximum value between d and 2: b=max(d, 2).

For most of the applications of the invention, d is greater than 2, so that a=2 and b=d. Next, at step /ii/, the three numbers α, β and γ are calculated such that:
α=a+b, which is equal to d+2,
$\beta = [(\alpha - 2)/(2 \cdot a \cdot b - \alpha)]^{1/2}$, which is equal to $[d/(3 \cdot d - 2)]^{1/2}$; and
γ=a+1/β.

The numbers α, β and γ may have been precalculated and stored in order to be directly accessible to the computing unit 3.

At the step /iii/, two numbers $u_1$ and $u_2$ are generated randomly each according to the uniform statistical distribution law, between 0 and 1, for example using a method of the LFSR type. Then the numbers V, W, Z, R and S are calculated at step /iv/, according to the following formulae:
$V = \beta \cdot \log[u_1/(1-u_1)]$, where log designates the base-e logarithmic function,
$W = a \cdot \exp(V)$, where exp designates the base-e exponential function,
$Z = u_1^2 \cdot u_2$,
$R = \gamma \cdot V - \log(4)$, and
S=a+R−W.

The value of the number Z can advantageously be calculated each time by applying the calculation method of an estimation of $X^\alpha$ that was described above, to $X = u_1$ with α=2. Furthermore, the values of the logarithm and exponential functions can be obtained from tables of values prerecorded for these functions.

Steps /v/ to /viii/ are then implemented successively, forming a sequence of tests that are applied in series:
step /v/: if S+1+log(5) is greater than or equal to 5·Z, go directly to step /viii/;
step /vi/: if S is greater than or equal to log(Z), go directly to step /viii/;
step /vii/: if $R + \alpha \cdot \log[\alpha/(b+W)]$ is less than log(Z), go back to step /iii/;
step /viii/: if a is equal to d, then the value $\beta_i$ that is generated randomly according to the beta law of parameters d and 2, is equal to W/(b+W), and if a is different from d, it is equal to b/(b+W). For most of the applications of the invention, where d is greater than 2, the random value $\beta_i$ is equal to d/(d+W).

One of the advantages of this algorithm is that the number of implementations of the sequence of steps /iii/ to /viii/that is necessary for obtaining the N random values $\beta_i$ is predictable.

It is clear that the invention can be reproduced by modifying secondary aspects of the implementations that have been described in detail above, while keeping at least some of the advantages mentioned. Among such possible modifications, the following are cited non-limitedly:
alternative algorithms may be used for some steps or sub-steps;
the inertial unit may be used as a source for measuring the complete state of the vehicle. The state of the system as considered for the invention then comprises three acceleration values and three angular velocity values, according to the three spatial coordinates, in addition to the three values of spatial coordinates that identify a position for the vehicle, three speed values and three angular attitude values. In this case, each state of the system comprises values for fifteen state coordinates;

in step /1/, a dynamic state-evolution model may be used for the system, this model being able to take account, when it is a vehicle, of commands that are applied to one or more engines and to an attitude control system of the vehicle; and the computing unit may be a processor with an ARM structure, a processor with several computing cores, one or more graphics processors, etc., in place of a chip of the FPGA, DSP, CPU or RISC type.

Finally, the invention may be applied to fields other than aeronautics. For example, a box-regularized particle filtering method that is in accordance with the invention may also be implemented for a vehicle on the ground, a surface seagoing ship, a submarine, a satellite or a space probe, using in each case a reference frame and true state measurements that are suitable.

The invention claimed is:

1. A box-regularized particle filtering method, for predicting a state of a system by a set of state intervals with weights associated with said state intervals, to form a probability distribution that characterizes the state of the system, said system being a land, air, sea or space vehicle that is provided with a navigation system using measurement correlation, the method comprising:

iteratively measuring accelerations and angular velocities of the vehicle using an inertial system to obtain measurements of accelerations and angular velocities used to obtain the set of state intervals of the vehicle, each of the set of state intervals comprising position, speed and attitude coordinates of said vehicle; and repetitively applying a sequence of steps to the set of state intervals with the associated weights for updating the state intervals and said associated weights, the sequence of steps comprising a smoothing step that consists in modifying at least one of the state intervals by applying random modifications to one of: (i) a set of interval bounds, and (ii) center values and interval lengths, that determine the state interval according to state coordinates of the system in order to correct at least one drift of the inertial system by using measurement correlation between the set of state intervals and the updated set of state intervals, wherein the random modifications relating to each state interval to be modified, which is identified by an integer index i, are determined by:

generating a first random value, denoted $\beta_i$ and comprised between 0 and 1, the values 0 and 1 being permitted, according to a statistical-distribution beta law with a first parameter equal to d and a second parameter equal to 2, where d is a number of state coordinates of the system, generating 2·d second random values, denoted $v_{k,i}$, each according to a normal statistical distribution law with zero mean value and standard deviation equal to unity, where k is another integer index that varies from 1 to 2·d and identifies the interval bounds, or center values and interval lengths, for each state interval, calculating a first number, denoted $\xi_i$, according to the first formula: $\xi_i = [\Sigma_{k=1 \ to \ 2\cdot d} (v_{k,i})^2]^{1/2}$, calculating a second number, denoted $\alpha_i$, according to the second formula: $\alpha_i = \beta_i^{1/2}/\xi_i$, and calculating 2·d third numbers, denoted $\varepsilon_{k,i}$, according to the third formula: $\varepsilon_{k,i} = v_{k,i} \cdot \alpha_i$, and wherein the random modifications that are applied to the state interval i are proportional to the 2·d third numbers $\varepsilon_{k,i}$, with a proportionality coefficient that is non-zero and common to said random modifications.

2. The method according to claim 1, wherein, all the interval bounds, or center values and interval lengths, which determine the state interval i, are modified by:

combining the random modifications that relate to said state interval i using a square matrix of dimension 2·d, to obtain 2·d combinations of random modifications, and then adding said combinations of random modifications that are obtained one-to-one to the interval bounds, or center values and interval lengths, of the state interval i.

3. The method according to claim 2, wherein the matrix that is used to combine the random modifications is such that the product of said matrix multiplied by a transpose of said matrix is equal to a mean product matrix, said mean product matrix being square of dimension 2·d, and having as coefficients mean values that are calculated over all the state intervals, of products of the interval bounds, or center values or interval lengths, taken in pairs separately for each state interval.

4. The method according to claim 3, wherein each first random value $\beta_i$ is generated using an algorithm that combines:

a generation of two random numbers each according to a uniform statistical distribution law, and at least one acceptance criterion that is based on the two random numbers, such that, in a case in which said at least one acceptance criterion is satisfied, a first of the two random numbers is used to calculate the first value $\beta_i$, and in a case in which the at least one acceptance criterion is not satisfied, the generation of the two random numbers is recommenced.

5. The method according to claim 3, wherein each second random value $v_{k,i}$ is calculated as a sum of several initial random values, each of said initial random values being generated according to a uniform statistical distribution law.

6. The method according to claim 2, wherein each first random value $\beta_i$ is generated using an algorithm that combines:

a generation of two random numbers each according to a uniform statistical distribution law, and at least one acceptance criterion that is based on the two random numbers, such that, in a case in which said at least one acceptance criterion is satisfied, a first of the two random numbers is used to calculate the first value $\beta_i$, and in a case in which the at least one acceptance criterion is not satisfied, the generation of the two random numbers is recommenced.

7. The method according to claim 2, wherein each second random value $v_{k,i}$ is calculated as a sum of several initial random values, each of said initial random values being generated according to a uniform statistical distribution law.

8. The method according to claim 1, wherein each first random value Bi is generated using an algorithm that combines:

a generation of two random numbers each according to a uniform statistical distribution law, and at least one acceptance criterion that is based on the two random numbers, such that, in a case in which said at least one acceptance criterion is satisfied, a first of the two random numbers is used to calculate the first value $\beta_i$, and in a case in which the at least one acceptance criterion is not satisfied, the generation of the two random numbers is recommenced.

9. The method according to claim 8, wherein each of the two random numbers is generated using a method of the shift register type with linear feedback.

10. The method according to claim 9, wherein each second random value $v_{k,i}$ is calculated as a sum of several initial random values, each of said initial random values being generated according to a uniform statistical distribution law.

11. The method according to claim 8, wherein each second random value $v_{k,i}$ is calculated as a sum of several initial random values, each of said initial random values being generated according to a uniform statistical distribution law.

12. The method according to claim 1, wherein each second random value $v_{k,i}$ is calculated as a sum of several initial random values, each of said initial random values being generated according to a uniform statistical distribution law.

13. The method according to claim 1, wherein respective estimations of each first number $\xi_i$ and of each second number $\alpha_i$ are obtained, where X is a positive or zero variable number and $\alpha$ is an exponent value equal to 2 or ½, by:
writing the number X in the form $X=(1+m)\cdot 2^{ex}$, where ex is a negative, positive or zero integer, and m is a mantissa comprised between 0 and 1, the value 0 and being permitted, so that a binary representation of the number X is:
$I(X)=L\cdot(m+ex+B)$, where $L=2^n$ with n being a number of bits of a binary writing of the mantissa m, and B being a positive or zero constant number, referred to as bias,
calculating a binary representation of $X^\alpha$ in the form:
$I(X^\alpha)=\alpha\cdot I(X)+L\cdot(1-\alpha)\cdot(B-\sigma)$, where $\sigma$ is a constant number the value of which is recorded, and
obtaining the estimation of the value of $X^\alpha$ from the binary representation $I(X^\alpha)$,
the writing, the calculating, and the obtaining being applied to $X=\Sigma_{k=1 \text{ à } 2\cdot d}(v_{k,i})^2$ with $\alpha=\frac{1}{2}$, to obtain an estimation of the first number $\xi_i$, and
the writing, the calculating, and the obtaining being applied to $X=\beta_i$ with $\alpha=\frac{1}{2}$, to obtain an estimation of the second number $\alpha_i$ as a result of a division of the estimation of $\beta_i^{1/2}$ by the estimation of the first number $\xi_i$.

14. The method according to claim 13, wherein the obtaining of the estimation of the value of Xa is completed by, after the obtaining:
calculating a new estimation of the value of $X^\alpha$ from a prior estimation of the value of $X^\alpha$, by applying an approximate equation resolution recursive algorithm to the equation $Y^{1/\alpha}-X=0$ of unknown Y, the estimation of the value of $X^\alpha$ that was obtained being used as prior estimation for a first application of said algorithm, and the new estimation of the value of $X^\alpha$ that is produced by a $q^{th}$ application of the algorithm forming the prior estimation of the value of $X^\alpha$ for the $(q+1)^{th}$ application of said algorithm, in a case in which such $(q+1)^{th}$ application of the algorithm is carried out, q being an integer greater than or equal to 1.

15. The method of claim 13, wherein the writing, the calculating, and the obtaining are applied previously to an absolute value of each second random value, according to $X=|v_{k,i}|$, with $\alpha=2$.

16. The method according to claim 1, wherein the sequence of steps that is applied repetitively for updating the state intervals with the weights that are associated with said state intervals comprises steps /1/ to /5/:
/1/ a prediction step, comprising predicting subsequent state intervals, each subsequent state interval being obtained by applying at least one propagation rule to one of a plurality of prior state intervals,
/2/ a step of measuring a true state of the system,
/3/ a step of contracting at least one of the subsequent state intervals, according to at least one result of measuring the true state that was obtained at step /2/,
/4/ a weight updating step, comprising allocating a weight to each subsequent state interval according to a size of said subsequent state interval as resulting from step /3/, a size of said subsequent state interval as resulting from step /1/ before step /3/, and a weight of the prior state interval from which the subsequent state interval resulted during step /1/, and
/5/ a step of redistributing the state intervals, comprising replacing at least one of the subsequent state intervals by a plurality of sub-intervals that result from a division of the subsequent state interval, each sub-interval forming a new state interval, said redistribution step comprising applying the smoothing step to at least each new state interval,
the state intervals as resulting from an implementation of the sequence of steps /1/-/5/, comprising the new state intervals and subsequent state intervals that were kept without being replaced by a plurality of new state intervals, being intended to constitute the prior state intervals for a following implementation of the sequence of steps /1/ to /5/.

17. A computer comprising:
at least one first input configured to receive results of repeated measurements of acceleration and angular velocity of a system; and
a second input configured to receive results of repeated measurements of a true state of the system, supplementary with respect to the acceleration and angular velocity measurements,
wherein the computer is configured to implement the box-regularized particle filtering method according to claim 1, to output a series of state intervals with respective weights, the weight that is associated with each of the state intervals corresponding to a probability of the true state of the system being in said state interval.

18. The computer according to claim 17, wherein the computer consists of a circuit with an array of programmable ports, a circuit with an array of fixed ports, or a central processor.

19. A navigation system using a measurement correlation, the navigation system configured to be installed on board a vehicle, the navigation system comprising:
an inertial system configured to iteratively measure the accelerations and the angular velocities of the vehicle, and to deduce, by using results of the measurements of the accelerations angular velocities, subsequent state intervals respectively from a plurality of prior state intervals, each state of the vehicle comprising the position, the speed and the attitude coordinates of said vehicle;
a measurement system configured to iteratively measure at least one feature of a true state of the vehicle; and
the computer according to claim 10 configured to reduce the at least one drift of the inertial unit, from a position drift, a speed drift and an attitude drift, using the results of measurement of the feature of the true state of the vehicle that are delivered by the measurement system.

20. A vehicle comprising:
the navigation system according to claim 19 using the measurement correlation.

* * * * *